Figure 7:
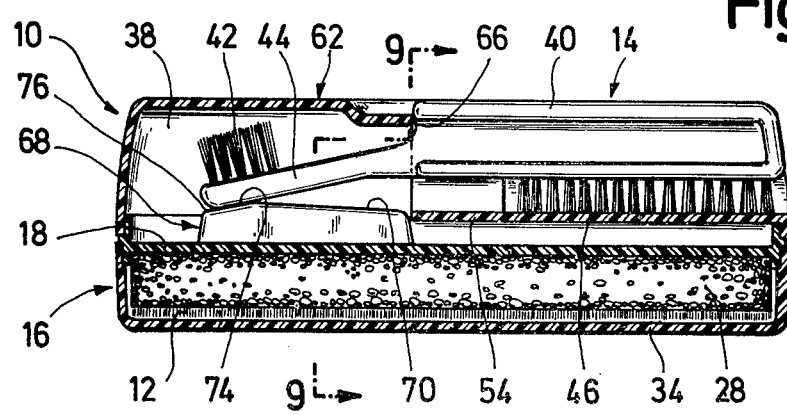

United States Patent [19]

Wittner et al.

[11] 4,023,677
[45] May 17, 1977

[54] CLEANING DEVICES FOR RECORDS AND PICKUP STYLI

[76] Inventors: Rudolf Wittner, Friedrich-Silcher-Str. 20; Fritz Härle, Mechenseestr. 4, both of 7972 Isny, Germany

[22] Filed: Mar. 11, 1976

[21] Appl. No.: 666,068

[30] Foreign Application Priority Data

Mar. 14, 1975 Germany .......................... 2511129

[52] U.S. Cl. .................................. 206/229; 15/106; 15/114; 401/125; 401/129
[51] Int. Cl.² .................. A45C 11/00; B65D 69/00; A46B 11/00; A47L 13/00
[58] Field of Search ............... 206/229, 362.2, 361; 401/129, 125; 15/106, 107, 114

[56] References Cited

UNITED STATES PATENTS

| | | | |
|---|---|---|---|
| 1,653,987 | 12/1927 | Cliffe | 401/129 |
| 2,808,606 | 10/1957 | Hill | 206/229 |
| 2,951,489 | 9/1960 | Roberts | 401/125 |
| 3,760,820 | 9/1973 | Seidler | 206/229 |

*Primary Examiner*—William T. Dixson, Jr.
*Attorney, Agent, or Firm*—Lawrence E. Laubscher

[57] ABSTRACT

A cleaning device for records and pickup style is disclosed, including a cleaning element supporting a stylus brush and having on its lower side a cleaning cover or layer for wiping over the record. A trough-like container is provided into which the cleaning element can be inserted so that its cleaning surface is enclosed. The stylus brush is detachably supported on the cleaning element by means of a fastening device.

11 Claims, 11 Drawing Figures

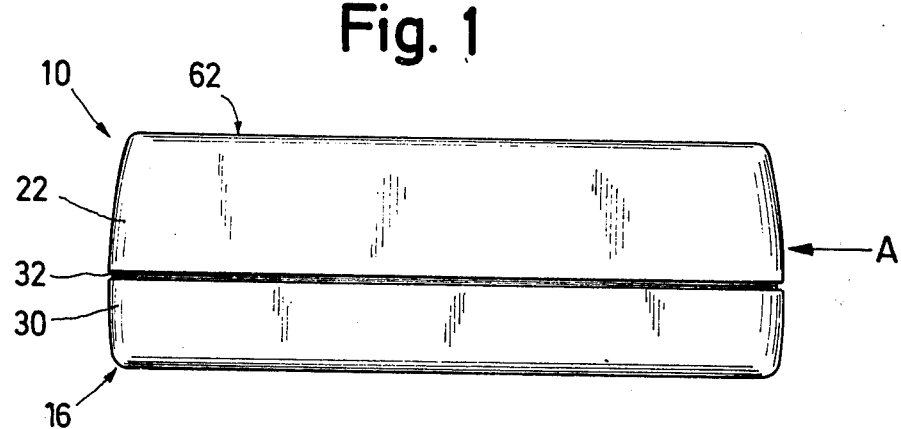
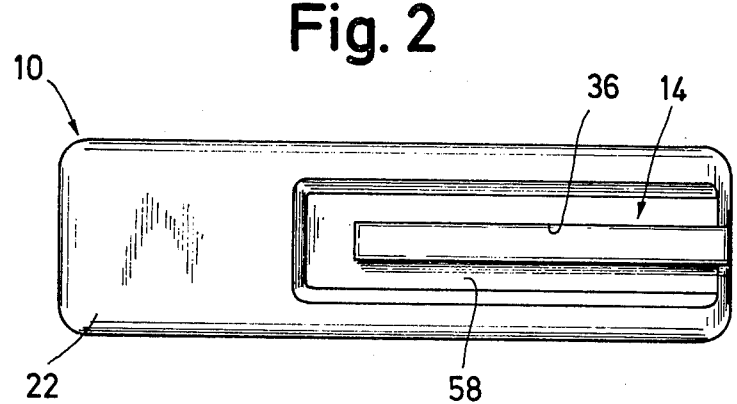
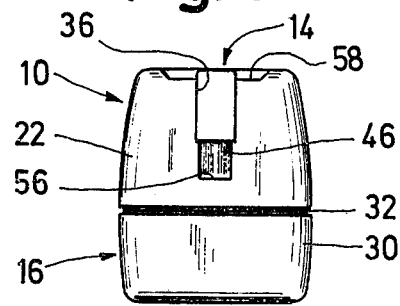

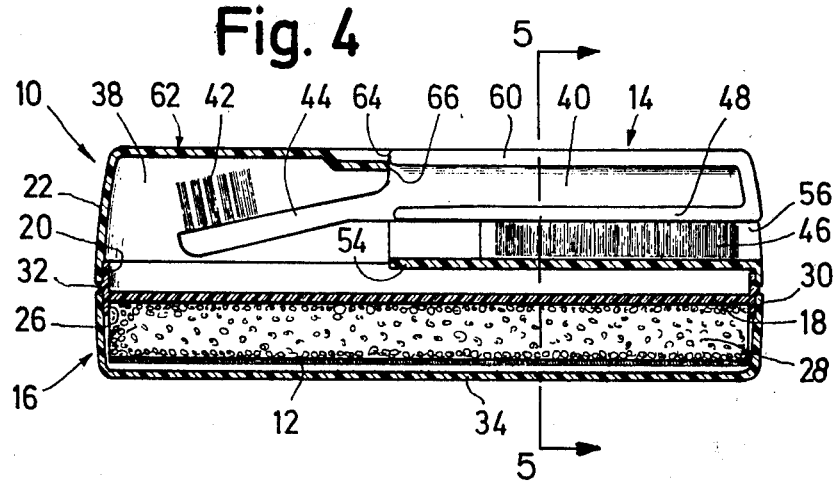
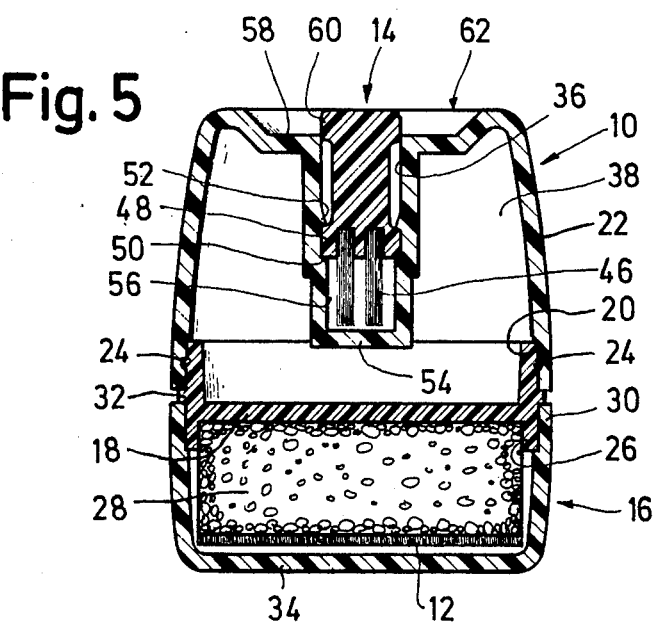
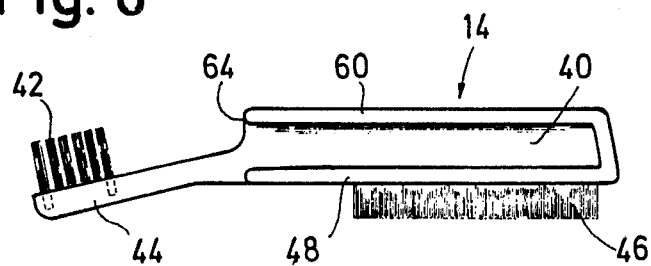

CLEANING DEVICES FOR RECORDS AND PICKUP STYLI

The invention relates to a cleaning device for records and pickup styli, comprising a cleaning element supporting a stylus brush and having on its lower side a cleaning layer for wiping over the record, and a trough-like container into which the cleaning element can be inserted in such a manner that its cleaning surface is enclosed.

A cleaning device of the initially described type has been commerically available for a long time. In this device the stylus brush is arranged directly on the cleaning element. For this purpose the latter comprises an elongated arm broadening at its base and constantly decreasing in height towards one of its ends to that it is approximately wedge-shaped when seen from the side. In this connection the stylus cleaner is arranged on the top side of the downwardly drawn arm end while the cleaning surface is provided on the broad base surface of the arm. To protect the fine hair bristles of the stylus cleaner from dust and dirt, a cover is moulded to the trough-shaped container, open at the top, in the vicinity of one end, the wall of the cover facing the other end of the container comprising an insert opening into which the end of the cleaning element provided with the stylus cleaner can be introduced in such a manner that, when the cleaning element is in the final receiving position in the container, the latter substantially seals the opening in the cover (German published patent application 1,175,904).

The stylus brush and cleaning layer in this cleaning device are therefore located on the same carrier formed by the cleaning element which is therefore correspondingly manipulated for cleaning a pickup stylus. This calls for the base of the cleaning element carrying the cleaning layer to be relatively narrow in design and for the part forming the arm to be correspondingly low in height so that, particularly in the case of record players with an automatic pickup arm in which the distance between the pickup and the chassis or turntable is relatively small, proper manipulation of the cleaning device between pickup arm and chassis or turntable is still possible. Accordingly, the arrangement of the stylus cleaner and cleaning layer on a common carrier also makes it necessary for the face of the cleaning element receiving the cleaning layer to be correspondingly small so that for record cleaning the cleaning device needs to be applied several times to obtain satisfactory cleaning of the record. The encapsulated arrangement of the stylus brush, moreover, necessitates quite specific manipulation of the cleaning element to deposit same in the trough-like container, which may very often only be achieved through corresponding fumbling around in the event of adverse light conditions particularly when the container is for example screwed firmly in a cabinet and mutual handling of the cleaning element and container is therefore impossible. Finally, the cleaning element which is bulkly in relation to the small stylus brush scarcely permits delicate cleaning of the sapphire stylus in a pickup head.

SUMMARY OF THE INVENTION

The primary object of the invention is to provide a cleaning device of the type mentioned at the beginning of the specification which permits the cleaning element to be easily removed from and deposited in the container, which enables more rapid record cleaning and in which finally a short distance between the pickup head and the chassis or turntable of a record player can no longer adversely affect the cleaning of the sapphire stylus. This problem is sovled in accordance with the invention by the stylus brush being detachable supported on the cleaning element, In a cleaning device of this type the special design of the stylus cleaner enables the cleaning element and particularly its base for receiving the cleaning layer to be correspondingly large in design so that a single application of the cleaning element to a revolving record is sufficient for it to be intensively cleaned. On the other hand, the body of the stylus brush can be slender and elegantly designed so that it may be advantageously manipulated between the record playing unit and the pickup arm even in restricted spaces and the sapphire stylus delicately cleaned. Another advantage of the embodiment according to the invention is that the used cleaning element only needs to be mounted on the trough-like container to seal the cleaning layer and in this case it is unimportant from which direction the cleaning element is moved over the container for this purpose.

OBJECTS OF THE INVENTION

The primary object of the present invention is to provide a cleaning device in which the stylus brush is held at the cleaning element and is easily detachable therefrom.

A more specific object of the invention is to provide a cleaning device in which the stylus brush in the cleaning element is prevented from being automatically released from the cleaning element.

A further object of the present invention is to provide a cleaning device in which it is easy to remove the stylus brush from the cleaning element with one hand by pushing the handle of the stylus brush out of the guide groove with the thumb of this hand.

A further object of the invention is to provide a cleaning device in which the bristles of the stylus brush are concealed when the stylus brush is in its inserted position in the cleaning element.

A further object of the invention is to provide a cleaning device in which the cleaning of the cleaning layer is also possible with the aid of the stylus brush by the latter being provided with a second brush.

A further object of the invention is to provide a cleaning device in which the bristles of the second brush are also concealed when the stylus brush is in its inserted position in the cleaning element.

A further object of the invention is to provide a cleaning device in which the bristles of both brushes are arranged at opposite sides of the brush handle in such a manner that their birstles are in the operating position when the stylus brush is pulled out, in that the bristles for the sapphire stylus extend upwards and those for the cleaning layer downwards.

It is advantageous in this connection if the stylus brush can be substantially fully inserted into a recess in the cleaning element and the stylus brush is in this case designed approximately like a toothbrush.

In a preferred embodiment the construction is such that the recess, beginning at the front end of the cleaning element, extends in the longitudinal direction thereof and — starting from this front end — forms over part of its length a guide groove for receiving the handle of the stylus brush, which groove leads into an inner space inside the cleaning element for accommodating the handle end of the stylus brush carrying the bristles. Therefore, with the styllus cleaner inserted in the cleaning element, the bristles are located within a receiving space enclosed on all sides and thus effectively protected from dust and dirt. The stylus brush may be advantageously removed from the guide groove in the cleaning element by hand if the stylus brush handle, with the brush inserted in the cleaning element, projects slightly upwardly from its groove. It is therefore possible to apply the thumb to the brush handle and push it out of the cleaning element in the direction of the front end of same. Such manipulation of the stylus brush is most advantageous if the guide groove for receiving the brush is provided on the longitudinal side of the substantially rectangular cleaning element opposite the cleaning layer so that the hand holding the cleaning element can overlap the cleaning layer without coming into contact with a greater area thereof.

In another advantageous embodiment of the cleaning device the guide groove of the cleaning element and the handle of the stylus brush comprise guide elements which cooperate positively and/or frictionally with one another and, upon appropriate manipulation of the cleaning element, prevent the stylus brush being automatically released from the cleaning element. In addition it is advantageous if the handle of the stylus brush is approximately double T-shaped in cross-section so that at least one of the flange-like broadened longitudinal edges of the brush handle forms a guide element for cooperating positively or frictionally with a guide element of the cleaner.

Another possibility for operationally reliable supporting of the stylus brush in the cleaning element may be achieved if a higher portion projecting slightly above the plane of movement of the brush extension carrying the bristles is arranged at the bottom of the cleaning element interior, in alignment with and some distance from the guide groove, the extension of the stylus brush overrunning on to the said higher portion at least shortly before its final inserted position and gripping it at the rear when the brush is in the final inserted position. The arrangement of an elevated portion inside the cleaning element interior means that during its insertion into the guide groove of the cleaning element the stylus brush is raised from a predetermined insert position on the side of its extension carrying the bristles thereby achieving firstly guiding through the cleaning element of the entire brush handle cooperating positively with guide means in the guide groove and secondly a pressure point effect shortly before its final insert position is reached so that the brush is securely retained in a definite position in the cleaning element.

An advantageous embodiment is obtained in this connection if the elevated portion comprises a web whose upper longitudinal side forms an obliquely rising run-on edge which, to achieve the pressure point effect, slopes away obliquely at its rear end. In this connection this web may be advantageously extended as far as the point of entry of the guide groove into the cleaning element interior so that, from the moment when the extension moves into the interior of the cleaning element, the said brush extension carrying the bristles is continuously raised with ease thereby ahcieving play-free movement of the brush handle through the guide groove over a relatively large area. The pressure point provided by the elevated portion or web also ensures that the brush handle occupies a position parallel to the receiving guide groove when the stylus brush is in the final insert position in the cleaning element. In another advantageous embodiment of the invention it is also preferable for the construction to be such that when in its final insert position inside the cleaning element, the stylus brush extension carrying the bristles bears positively against the sloping away rear part of the overrunning edge. The bristles are advantageously arranged on the brush handle so that they are provided on an extension which is moulded to one end of the brush handle and which, when in the plane of the handle, extends obliquely therefrom. This arrangement of the extension enables the stylus brush to be particularly advantageously applied to sapphire styli and the like. Moreover, with respect to the design of the cleaning element, it also provides constructional advantages in that consequently the interior of the cleaning element for receiving the bristles does not need to be so high that the cleaning element needs to have a greater height in the vicinity of this interior. In this connection it is advantageous if the bristles on the extension of brush handle extend in the direction of an imaginary continuation of the open groove side or are located on the side of the hand holding the handle so that the stylus brush is already correctly positioned in the hand for use when its handle, having been pushed out of the cleaning element, is gripped in the hand.

Moreover, another important advantage may be obtained if a second brush for cleaning the cleaning layer is arranged on the stylus brush. Therefore the cleaning device according to the invention affords the advantage that the fibre and dust deposits which collect on the cleaning surface during cleaning of a record may be immediately removed again therefrom with the aid of the additional cleaning brush on the body of the stylus brush. Cleaning of the cleaning layer in the case of all known embodiments of record cleaning devices was hitherto always left to the use, the said cleaning layer frequently being cleaned on clothing — in the absence of a suitable cloth or the like. This handicap resulting from the lack of a cleaning facility for the cleaning layer is therefore overcome with the cleaning device according to the invention.

In order that the cleaning brush may remain invisible when the stylus brush has been inserted in the cleaning element, the depth of its guide groove is elected so that the cleaning brush lies in the intermediate space between the brush body and the bottom of the groove.

In another advantageous embodiment according to the invention the cleaning surface of a pad carrying same is attached to a carrier which is in turn positively inserted in or mounted on the cleaning element on its lower side and preferably retained by locking. This embodiment enables the cleaning element, which is advantageously designed as a plastic moulding, to be open on one side for the manufacture thereof, thereby substantially simplifying particularly the arrangement of the cleanig element with the interior for accommodating the bristles of the stylus brush. In this connection the carrier supporting the cleaning surface or pad may be fixed to the bottom side of the cleaning element very simply by hand, in which case finally both parts combine with particularly the container to form a substantially rectangular constructional unit whose corners and edges are advantageously rounded to prevent damage to records or pieces of furniture.

Preferred embodiments of the invention are illustrated in the drawing.

Figure 8:
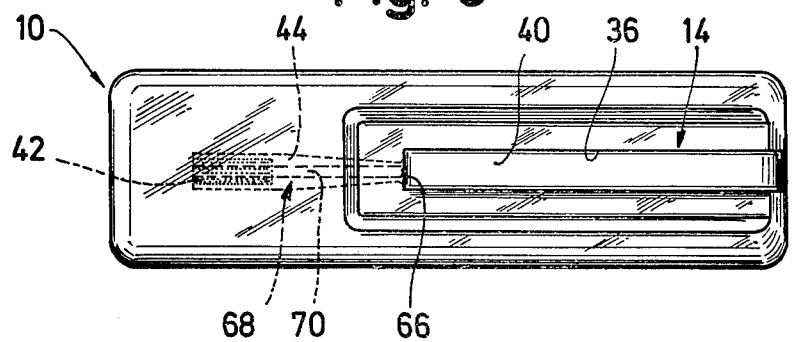
Figure 9:
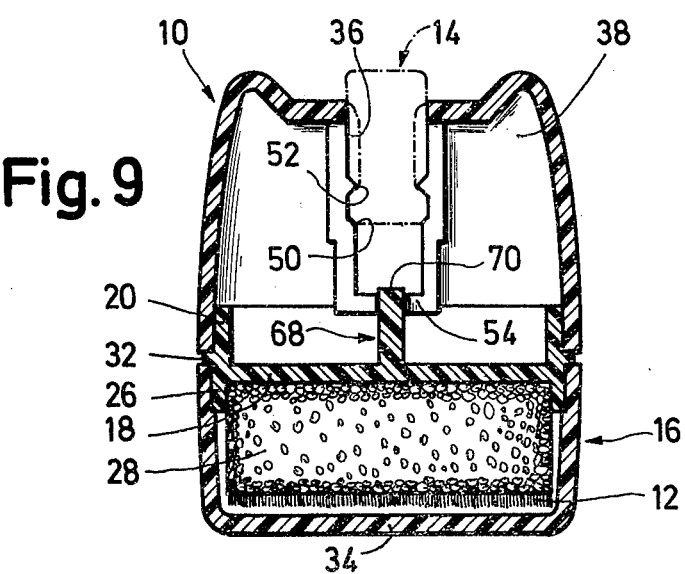
Figure 10:
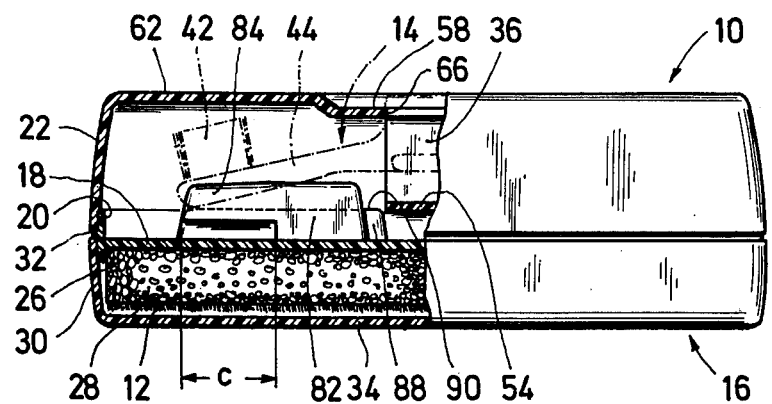
Figure 11:
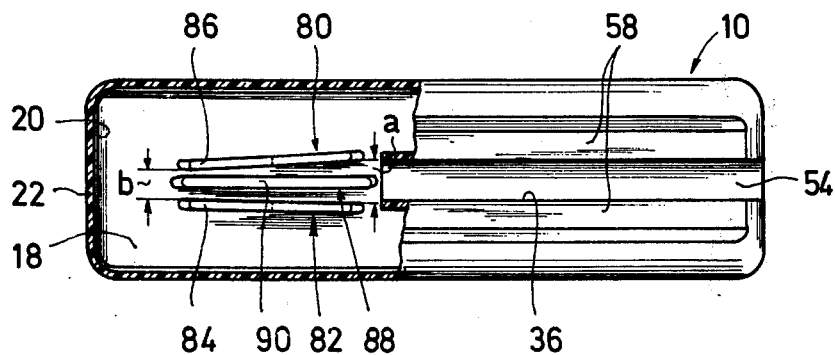

FIG. 1 shows a front elevation of a first embodiment of a cleaning device according to the invention in the closed position, FIG. 2 shows a plan view of the cleaning device, FIG. 3 shows an end view of the cleaning device, when seen in the direction of arrow A in FIG. 1, FIG. 4 shows a longitudinal section through the closed cleaning device according to FIG. 1, FIG. 5 is a cross-section of the cleaning device along the line 5—5 shown in FIG. 4 and on a large scale than FIG. 4, FIG. 6 is a front elevation view of the stylus brush, having been removed from the cleaning element of the cleaning device, FIG. 7 shows a longitudinal section through a second embodiment of a cleaning device, FIG. 8 is a plan view of the cleaning device shown in FIG. 7, FIG. 9 is an enlarged cross-section through the cleaning device along the line 9—9 shown in FIG. 7, the stylus brush having been removed from the cleaning element, FIG. 10 is a partly broken longitudinal section of a third embodiment of the cleaning device, and FIG. 11 is a partly broken plan view of the cleaning device in accordance with FIG. 10.

The cleaning device shown in the drawings consists of a housing generally designated by reference numeral 10 supporting on its lower side a cleaning layer 12, a stylus brush 14 insertable into an opening contained in the housing, as well as a trough-like container 16 open at the top into which the lower portion 18 of the housing for supporting the cleaning layer can be introduced in such a manner that the cleaning layer is tightly enclosed. As can be seen from FIGS. 1 to 3, the housing 10 and container 16 together form an approximately rectangular body whose corners and edges are rounded to prevent damage inadvertently being done to records or pieces of furniture during manipulation of the cleaning device.

The lower portion 18 of the housing is firmly inserted into the lower open part of the top portion 22 of the housing with a surrounding edge 20, for the purpose of which locking projections which are locked in associated locking recesses in the top portion 22 are preferably moulded to the outer circumference of the edge 20. This locking connection can be seen at 24 in FIG. 5. Due to the housing being formed of upper and lower portions 18, 22 its manufacture as a basically hollow plastic moulding is particularly advantageous. Attached to the lower side of the lower portion 18, which is also defined by a surrounding edge 26, is a relatively thick cleaning pad 28 preferably made of foam material which supports the cleaning surface 12 on its lower flat side. When the housing 10 has been inserted into the container 16 its wall 30 grips around the lower edge 26 of the lower portion 18 so that the cleaning pad 28 and cleaning layer 12 are tightly enclosed on all sides. On the one hand, this effectively protects the cleaning layer from dirt and, on the other hand, ensures that the antistatic solution sprayed on the cleaning cover pad cannot evaporate so quickly. As shown in FIGS. 4 and 5, the trough-like container 16, with the housing mounted, bears with its upper edge against an edge 32 formed on the outer circumference of the lower portion 18, whereby the depth of engagement of the housing in the container is determined in such a manner that there is preferably a space between the cleaning cover 12 and the bottom 34 of the container 16.

As can be seen from FIGS. 2, 3 and 5, contained within the top side of the housing 10 is a guide groove 36 extending in the longitudinal direction thereof and leading out at its right end as shown in FIGS. 2 and 4, said groove being preferably slightly longer than half the length of the housing. At its inner end the guide groove leads into an inner space 38 inside the housing. The stylus brush 14 can be slidably inserted into the guide grovve. As shown in FIG. 6 this comprises a long narrow brush body 40 acting as a handle which — as can be seen from FIG. 5 — is approximately double T-shaped in cross-section. The bristles 42 of the stylus brush are located on an extension 44 which is formed on one end of the brush body 40 and extends obliquely downwardly therefrom as shown in FIG. 6. In this connection the bristles are arranged in such a manner that, with the stylus brush in the inserted position, they project obliquely upwardly. This ensures that the stylus brush, after its removal from the cleaning element, is already correctly positioned in the hand for cleaning a sapphire stylus. As is also shown in FIG. 6, a second brush 46 is located on the bottom side of the brush handle for cleaning the cleaning cover.

While the bristles 46, 42 are relatively soft for the pickup stylus or sapphire stylus, the bristles of the cleaning brush 40 are substantially harder. The brush 40 therefore enables the impurities which adhere to the surface of the cleaning cover to be wiped off. Since the cleaning brush bristles 46 are located on the lower logitudinal side of the brush handle 40 as shown in FIG. 6, it is also unnecessary in cleaning the cleaning cover to bring the stylus brush manually into a predetermined position; on the contrary, it may be put to immediate use as soon as it is removed from the housing.

As can be seen particularly from the illustration in FIG. 5, the stylus brush and guide groove comprise positively and frictionally mutually cooperating guide means 48, 50, 52 which firstly ensure precise guiding of the stylus brush through the guide groove and secondly prevent the automatic release of the stylus brush from the housing. The guide element 48 provided on the handle or brush body 40 of the stylus brush is in this case formed of the lower longitudinal edge which is broadened laterally in the manner of a flange and, when inserted, is supported on guide shoulders 50 of the groove walls. Reference numeral 52 designates projections which are formed on the walls of the groove above the flange-like broadened longitudinal edge 48 and prevent the stylus brush from falling out of the groove. In this case the depth of the guide groove 36 is selected so that the bristles of the cleaning brush 46 can extend downwardly into a free space 56 which is delimited by the bottom 54 of the groove. As can be clearly seen from FIG. 5, the guide groove is located in a slightly lower part 58 of the upper surface of the housing. In this case the height of the body 40 of the stylus brush 14 forming the brush handle is selected so that its upper longitudinal edge 60 which broadens laterally in the manner of a flange engages partially in the guide groove closing it at the top, and secondly is located substantially in the plane of the general upper surface 62 of the housing. Accordingly the stylus brush handle therefore projects slightly out of the lower face 58 and may as a result be easily gripped by the thumb of the hand holding the cleaning device, for example at 64, and pushed out of the housing. As can be seen from FIG. 4, the brush handle 40 comes into contact with an inner front end wall 66 of the guide groove 36 when the stylus brush is in the inserted position so that the interior 38 of the housng 10 for receiving the bristles of the stylus brush is completely sealed off from the outside thereby preventing any dust or dirt from reaching the bristles 42. The separable and combinable arrangement of the housing and sylus brush enables the size of the housing and therefore the size of the surface of the cleaning cover 12 to be selected so that a single application of the housing is sufficient to clean the side of the record intensively.

The embodiment shown in FIGS. 7 to 9 differs from the previously described embodiment in that an upright web 68 is provided on the part 18 of the housing forming a bottom within the interior 38 of said housing in alignment with the guide groove 36, which web 68 extends into the housing interior preferably from the point of entry of the guide groove 36 into the said interior. The length of the web 68 is such that, with the stylus brush in the final insert position as shown in FIG. 7, the web seals off approximately the front end of the extension 44.

The longitudinal upper side of the web 63 forms a leading or run-on edge 70 which is located approximately at the point of entry of the guide groove 36 in the plane of the groove bottom 54 and then, as shown in FIG. 7 when locking to the left, generally rises slightly, i.e. the run-on edge 70 occupies an inclined position so that finally it projects slightly above the plane of movement of the extension 44 of the style brush 14 for supporting the bristles 42. This inclined run-on edge extends as far as the point designated by reference numeral 74. The latter is therefore located at a point which corresponds to a position of the sylus brush shortly before its final insert position is reached. Looking from the point 74 on the run-on edge 70, the trailing edge 76 in turn falls away obliquely, the end of the said trailing edge occupying an angular position which is approximately equal to that of the extension 44 of the stylus brush 14 when the latter is in its final insert position. When the stylus brush is inserted into the guide groove 36 in the housing, the free end of the extension 44 runs, upon entering the housing interior, on to the edge 70 of the web 68 whereby, upon further insertion of the stylus brush into the housing as shown in FIG. 7, the extension is deflected upwardly so that the brush handle 40 can press fully against the guide elements 52 of the guide groove 36 and is thereby guided without play through the guide groove. When the extension 44 of the stylus brush reaches the highest point 74 on the run-on edge, it engages and locks on the left or at the rear and bottom as a result of the following sloping trailing end 76 of the run-on edge as shown in FIG. 7, so that a pressure point is overrun to a certain extent and consequently the stylus brush firmly retained in its final insert position. Likewise a pressure point should first be overcome before the stylus brush 14 is removed from the housing. Secure mounting of the stylus brush 14 in the housing is thus ensured as a result of the elevated point which is provided by the web to produce the pressure point.

In the embodiment shown in FIGS. 10 and 11 instead of the web 68 according to FIGS. 7 to 9 the support means is provided with two erect webs 80, 82 located at the bottom 18 of the housing interior 38, and seen from the direction of insertion of the stylus brush 14 said webs converge and when the stylus brush is in its inserted position accommodate between themselves the extension 44 carrying the bristles 42 of the stylus brush to clean the sapphire. The mutual distance $a$ between the two webs 80, 82 at the end facing towards the guide groove 36 is larger than the width of the front end of the extension 44 carrying the bristles 42 of the stylus brush, while the distance $b$ between the webs at the end facing away from the guide groove 36 is smaller than the width of the extension 44 of the brush. As can be seen from FIG. 10, the two webs are not connected to the bottom 18 along their entire length, i.e., not along the area $c$. Accordingly, they form with their conveying end portions resilient, elastic clamping tongues 84, 88 which when the stylus brush 14 is inserted rest and are held by friction at the sides of the extension 44 of the stylus brush 14, thus holding the stylus brush securely in the housing. Between the two webs 80, 82 a third web 88 is present whose top edge 90 is located in the plane of motion of the front end portion of the extension 44 which is directed in an inclined downward direction and thus said top edge effectively supports the extension 44.

Without further analysis, the foregoing will so fully reveal the gist of the present invention that others can, by applying current knowledge, readily adapt it for various applications without omitting features which, from the standpoint of prior art, fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In an apparatus for cleaning records and pickup styli, including a hollow housing (22) containing at one end a chamber (38), the upper portion of the other end of said housing containing an opening (36) communicating with said chamber for slidably receiving the handle portion (40) of a stylus brush (14), said stylus brush having an extension portion (44) which is adapted to extend within said chamber and which carries upwardly extending stylus-cleaning bristles; record cleaning means (28, 12) carried by the bottom portion (18) of said housing; and an open-topped trough-shaped closure member (16) connected with the bottom portion of said housing to enclose said record cleaning means;

the improvement which comprises
support means (68; 80, 82, 88) connected with the bottom wall of said chamber for supporting the extension portion of the stylus brush when the stylus brush is inserted within the housing opening.

2. Apparatus as defined in claim 1, wherein said support means is in frictional engagement with the stylus brush extension.

3. Apparatus as defined in claim 2, and further wherein the housing contains guide means (50) arranged or opposite sides of the opening (36) for engaging the lateral surfaces of the body portion (40) of the stylus brush to longitudinally guide the brush during the introduction thereof into the housing opening.

4. Apparatus as defined in claim 3, wherein said support means comprises a pair of laterally-spaced longitudinally-extending web elements (80, 82) for frictionally engaging the lateral surfaces of the stylus brush extension.

5. Apparatus as defined in claim 4, wherein each of said web elements terminates adjacent the free extremity of the stylus brush extension portion in a resilient tongue portion (84, 88), said tongue portions being biased inwardly toward each other into frictional engagement with the lateral surfaces of the brush extension portion.

6. Apparatus as defined in claim 3, wherein said support means includes a longitudinally extending vertical web (68) arranged beneath the brush extension portion, said vertical web having a leading upper surface (70) which is upwardly inclined in the direction of the free extremity of the stylus brush extension when the stylus brush is introduced into the housing whereby during the introduction of the stylus brush within the housing, the lower surface of the brush extension portion rides in frictional engagement with the inclined leading surface of the vertical support web.

7. Apparatus as defined in claim 6, wherein the upper surface of the vertical support web (68) terminates in a downwardly inclined trailing portion (74), the free extremity of the brush extension being in fractional engagement with said trailing web surface when the stylus brush is completely introduced into the housing.

8. Apparatus as defined in claim 3, wherein said support means (68) extends toward said other end of said housing at least to the guide means (50) which engages the lateral surfaces of the stylus brush.

9. Apparatus as defined in claim 7, wherein the brush extension portion (44) is arranged at an oblique angle to the body portion (40) of the stylus brush, said guide means (50) being parallel with the bottom portion (18) of said housing, and said support web trailing surface being parallel with the brush extension portion.

10. Apparatus as defined in claim 3, wherein said housing includes beneath the opening (36) means defining a longitudinal compartment (56) for receiving a second set of bristles carried by the lower surface of the body portion (40) of the brush.

11. Apparatus as defined in claim 1, wherein said housing is sectional, the bottom portion (18) of the housing carrying said support means (68; 80, 82, 88) comprising a bottom section that is removably connected with a top section of the housing.

* * * * *